US012282337B2

(12) United States Patent
Kumar

(10) Patent No.: US 12,282,337 B2
(45) Date of Patent: Apr. 22, 2025

(54) DUAL AGENT REINFORCEMENT LEARNING BASED SYSTEM FOR AUTONOMOUS OPERATION OF AIRCRAFT

(71) Applicant: The Boeing Company, Chicago, IL (US)

(72) Inventor: Prabhat Kumar, Hajip (IN)

(73) Assignee: The Boeing Company, Arlington, VA (US)

( * ) Notice: Subject to any disclaimer, the term of this patent is extended or adjusted under 35 U.S.C. 154(b) by 181 days.

(21) Appl. No.: 17/721,041

(22) Filed: Apr. 14, 2022

(65) Prior Publication Data
US 2023/0025154 A1  Jan. 26, 2023

(30) Foreign Application Priority Data
Jul. 22, 2021 (IN) .............................. 202111032985

(51) Int. Cl.
G05D 1/00 (2024.01)
B64D 43/00 (2006.01)

(52) U.S. Cl.
CPC ............ G05D 1/085 (2013.01); B64D 43/00 (2013.01); G05D 1/0088 (2013.01); G05D 1/0623 (2013.01); G05D 1/101 (2013.01)

(58) Field of Classification Search
None
See application file for complete search history.

(56) References Cited

U.S. PATENT DOCUMENTS

| 9,019,128 B1* | 4/2015 | Kim ...................... G01C 23/00 701/14 |
| 9,053,159 B2 | 6/2015 | Quadracci et al. |
| 10,102,773 B2 | 10/2018 | Towers et al. |

(Continued)

FOREIGN PATENT DOCUMENTS

WO  WO-2021214098 A1 * 10/2021

OTHER PUBLICATIONS

Clarke, Robert, et al., "Closed-Loop Q-learning Control of a Small Unmanned Aircraft", Jan. 6-10, 2020, AIAA SciTech Forum (Year: 2020).*

(Continued)

*Primary Examiner* — Navid Z. Mehdizadeh
*Assistant Examiner* — Sarah A. Mueller
(74) *Attorney, Agent, or Firm* — Harrity & Harrity, LLP

(57) ABSTRACT

A dual agent reinforcement learning autonomous system (DARLAS) for the autonomous operation of aircraft and/or provide pilot assistance. DARLAS includes an artificial neural network, safe agent, and cost agent. The safe agent is configured to calculate safe reward Q values associated with landing the aircraft at a predetermined destination or calculated emergency destination. The cost agent is configured to calculate cost reward Q values associated with maximum fuel efficiency and aircraft performance. The safe and cost reward Q values are based on state-action vectors associated with an aircraft, which may include state data and action data. The system may include a user output device that provides an indication of an action to a user. The action corresponds to an agent action having the highest safe reward Q value and the highest cost require Q value. DARLAS prioritizes the highest safe reward Q value in the event of conflict.

20 Claims, 11 Drawing Sheets

(56) References Cited

U.S. PATENT DOCUMENTS

| | | | | |
|---|---|---|---|---|
| 11,560,146 B2* | 1/2023 | Nageshrao | ............ | G05D 1/0088 |
| 2014/0350750 A1* | 11/2014 | Burch | .................. | B64C 39/024 |
| | | | | 701/2 |
| 2018/0089563 A1* | 3/2018 | Redding | ................ | G06N 3/006 |
| 2020/0160151 A1* | 5/2020 | Urtasun | ................... | G06N 3/04 |

OTHER PUBLICATIONS

Furqan, Javaid Iqbal, "Neural Network Based Aircraft Control", Dec. 13-14, 2010, IEEE Student Conference on Research and Development, pp. 262-266 (Year: 2010).*

Machine translation of Gout et al. (WO-2021214098-A1) (Year: 2021).*

Wang, Lei, et al., "Explainable and Safe Reinforcement Learning for Autonomous Air Mobility", Nov. 2024, 2022, arXiv (Year: 2022).*

* cited by examiner

DUAL AGENT REINFORCEMENT LEARNING BASED SYSTEM FOR AUTONOMOUS OPERATION OF AIRCRAFT

CROSS-REFERENCE TO RELATED APPLICATIONS

This application claims the benefit of, and priority to, India Patent Application No. 202111032985, filed on Jul. 22, 2021, and entitled "Dual Agent Reinforcement Learning Based System for Autonomous Operation of Aircraft," the contents of which are herein incorporated by reference in their entirety.

FIELD OF THE DISCLOSURE

This disclosure is generally related to the field of autonomous operation of aircraft and, in particular, to a method and system for operating aircraft based on dual agent deep reinforcement.

BACKGROUND

Although pilots are typically well-trained, their actions to reach a predetermined destination may not be efficient or optimized. For example, a plane may arrive safely at the predetermined destination, but the flight of the aircraft may not have been the most efficient in regard to the amount of fuel consumed while traveling. Even well-trained pilots may make choices that lead to inefficient or less than optimal courses of action. Emergency situations may also provide additional inefficiencies.

Emergency situations in aircraft may put pressure on pilots and may place them in a stressful condition. While checklists and protocols exist to assist pilots during emergencies, the checklists and protocols are not typically tied to a current location and system state of the aircraft. Pilots make decisions regarding actions to be taken and, in extreme cases, determining safe landing zones.

While pilots are typically well-trained to handle emergency scenarios, no real-time cross-validation of a pilot's action is typically performed. Analysis is usually performed through debriefing after the emergency has been resolved. Further, no forecast or visualization of the action space and no prediction of the action space is typically performed. Thus, a pilot may not be certain regarding some outcomes that may result from their actions. Other disadvantages may exist.

SUMMARY

Described herein is a dual agent reinforcement learning autonomous system for the autonomous operation of an aircraft and/or to provide assistance to a pilot of an aircraft. The dual agent reinforcement learning autonomous system, also referred to herein as DARLAS, may be trained based on scenarios run in an aircraft simulator. DARLAS may compute velocities, altitudes, and headings of an aircraft from a given origin and destination without human intervention. Based on the computations, a safe agent of DARLAS may provide suggestive assistance and guidance to a pilot by translating the computed velocities, altitudes, and headings into control actions that can be performed by the pilot to arrive at a predetermined destination and/or to arrive at a calculated emergency destination in response to an emergency. Based on the computations, a cost agent of DARLAS may provide suggestive assistance and guidance to a pilot by translating the computed velocities, altitudes, and headings into control actions that can be performed by the pilot to increase fuel efficiency and aircraft performance. DARLAS will prioritize the suggestive assistance and guidance provided by the safe agent over the suggestive assistance and guidance provided by the cost agent to the extent there is conflict between the provided suggestive assistance and guidance. During normal flying condition DARLAS may act as a performance evaluation system. In either case, the pilot may remain in control of the aircraft.

In an example, a system comprises an artificial neural network, a cost agent, and a safe agent. The cost agent is configured to calculate a highest cost reward Q value based on state-action vectors associated with the aircraft, the highest cost reward Q value is associated with maximum fuel efficiency and aircraft performance, where the cost agent calculates a cost state-action vector based on the highest cost reward Q value. The safe agent is configured to calculate a highest safe reward Q value based on the state-action vectors associated with the aircraft and based on the cost state-action vector, the highest safe reward Q value is associated with landing the aircraft at a predetermined destination or a calculated emergency destination in response to an emergency, where the safe agent calculates a safe state-action vector based on the highest safe reward Q value. The state-action vectors include state data associated with the aircraft and action data associated with the aircraft. The artificial neural network determines an agent action based on the safe state-action vector and the cost state-action vector. The system includes a user output device configured to provide an indication of an action to a user, where the action corresponds to an agent action as determined by the artificial neural network.

Based on a version of a Bellman equation, the safe agent may iteratively update the highest safe reward Q value and the cost agent may iteratively updates the highest cost reward Q value. The cost state-action vector and the safe state-action vector may include common state-action vectors based on a loss function. When the safe state-action vector substantially differs from the cost state-action vector the artificial neural network may give priority to the safe state-action vector.

The state data may include data matrices associated with the aircraft, the data matrices indicating a heading value, a position value, a system state value, an environmental condition value, a feedback value, a pilot action value, a system availability value, a roll value, a pitch value, a yaw value, a rate of change of roll value, a rate of change of pitch value, a rate of change of yaw value, a longitude value, a latitude value, a rate of change of position value, a rate of change of velocity value, or any combination thereof. The action data may correspond to a change in heading, a change in velocity, a change in roll, a change in pitch, a change in yaw, a change in a rate of change of roll, a change in a rate of change of pitch, a change in a rate of change of yaw, change in a rate of change of position, a change in a rate of change of velocity, or any combination thereof. The agent action may be translated into an aircraft surface control action using an inverse aircraft model.

The agent action may be taken from a flight envelope including aircraft flight constraints, where the aircraft flight constraints include maps of acceleration and deceleration, rates of climb, rates of drop, velocity thresholds, roll change rate thresholds, pitch change rate thresholds, yaw change rate thresholds, roll thresholds, pitch thresholds, and yaw thresholds. The artificial neural network may include a deep Q network. The user output device may be incorporated into a cockpit of an aircraft, and where the indication of the action may include a visual indication, an audio indication, a written indication, or any combination thereof.

The artificial neural network may be implemented at one or more processors. The one or more processors may be further configured to determine the state data based on one or more aircraft systems and determine availability data associated with one or more aircraft systems. The one or more processors may be further configured to determine the calculated emergency destination based on the state data and based on the availability data in response to the emergency. The one or more processors may be further configured to determine the action data based on the calculated emergency destination, the availability data, the state data, and stored constraint data and generate the state-action vectors based on the state data and the action data.

The one or more processors may be further configured to determine heading and velocity data associated with minimized loss and optimized highest safe reward Q value and the highest cost reward Q value. The one or more processors may be further configured to perform one or more inverse dynamics operations to translate the heading and velocity data into the agent action. The one or more processors may be further configured to generate updated state-action vectors associated with the aircraft based on updated state data and updated action data. The one or more processors may be further configured to calculate an additional highest cost reward Q value based on the updated state-action vectors and calculate and additional highest safe reward Q value based on the update state-action vectors and the additional highest cost reward Q value. The user output device may be configured to provide an additional indication of an additional action to the user, where the additional action corresponds to an updated agent action that has the updated highest safe reward Q value and the updated highest cost reward Q value as calculated by the artificial neural network.

One example of the disclosure is a method for training an artificial neural network for a pilot assistance system. The method includes generating training data for a deep Q network. The method includes receiving state data associated with an aircraft and an environment of the aircraft from a simulator while a user is operating the simulator and receiving action data from the simulator associated with actions by the user. The method includes generating a set of state-action vectors based on the state data and the action data and utilizing a safe agent, the safe agent determining a safe reward Q value associated with the set of state-action vectors. The method includes utilizing a cost agent, the cost agent determining a cost reward Q value associated with the set of state-action vectors and estimating a common state action by minimizing loss based on the safe reward Q value and the cost reward Q value. The method includes updating a current state of the aircraft based on the common state action and training a deep Q network based on the training data.

The method for training an artificial neural network for a pilot assistance system may include generating additional training data by receiving automated state data associated with the aircraft from a memory, the automated state data corresponding to an automated scenario. The method may generate additional training data by receiving automated action data from the memory, the automated action data associated with the automated scenario and generating an additional set of state-action vectors based on the automated state data and the automated action data. The method may generate additional training data by determining an additional safe reward Q value associated with the additional set of state-action vectors and determining an additional cost reward Q value associated with the additional set of state-action vectors. The method may generate additional training data by optimizing the safe reward Q value and the cost reward Q value by minimizing loss based on $L=E[Q(s_t, a_t)-(r_t+\gamma \max_a'Q(s_t+1, a'))]^2$ and training the deep Q network based on the additional training data.

The state data may include data matrices associated with the aircraft, the data matrices indicating a heading value, a position value, a system state value, an environmental condition value, a feedback value, a pilot action value, a system availability value, a roll value, a pitch value, a yaw value, a rate of change of roll value, a rate of change of pitch value, a rate of change of yaw value, a longitude value, a latitude value, a rate of change of position value, a rate of change of velocity value, or any combination thereof. The action data may correspond to a change in heading, a change in velocity, a change in roll, a change in pitch, a change in yaw, a change in a rate of change of roll, a change in a rate of change of pitch, a change in a rate of change of yaw, change in a rate of change of position, a change in a rate of change of velocity, or any combination thereof.

One example of the disclosure is an emergency pilot assistance method. The method includes calculating a safe reward Q value using a deep Q network, wherein the safe reward Q value is based on state-action vectors associated with an aircraft. The method includes calculating a cost reward Q value using a deep Q network, wherein the cost reward Q value is based on the state-action vectors associated with the aircraft. The state-action vectors include state data associated with the aircraft and action data associated with the aircraft. The method includes providing an indication of an action to a user at a user output device, wherein the action corresponds to an agent action that has a highest safe reward Q value and highest cost reward Q value as calculated by the deep Q network when no conflict exists between the highest safe reward Q value and highest cost reward Q value.

The method may include calculating an alternate cost reward Q value using a deep Q network, wherein the alternate cost reward Q value is based on the state-action vectors associated with the aircraft and substantially corresponds to the highest safe reward Q value. The highest safe reward Q value may be associated with landing the aircraft at a predetermined destination or a calculated emergency destination in response to an emergency.

Figure 1:
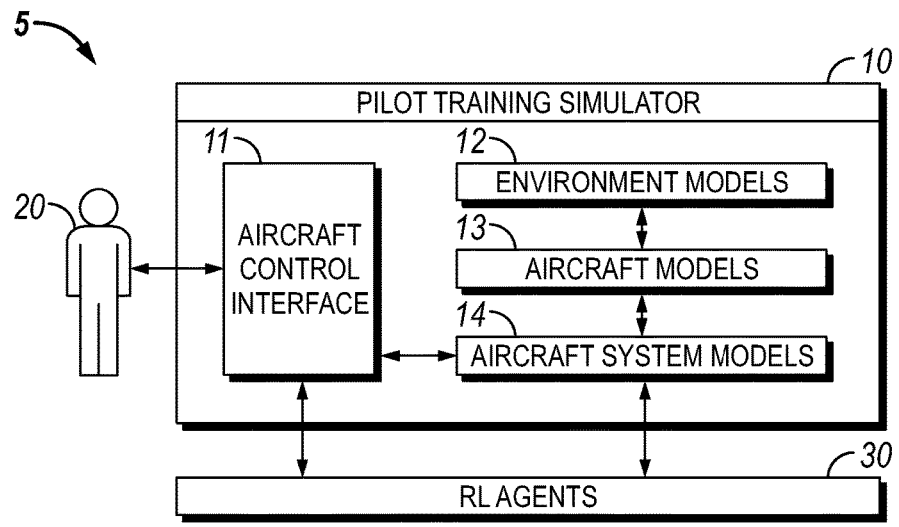
FIG. 1 is schematic that shows a first training phase of the dual agent reinforcement learning based system for autonomous operating of an aircraft or pilot assistance system (DARLAS).

While the disclosure is susceptible to various modifications and alternative forms, specific examples have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Described herein is a dual agent reinforcement learning based autonomous pilot or pilot assistance system (DARLAS), also referred to herein as a dual agent system, which can be trained using an aircraft simulator and can perform the tasks of computing velocities, altitudes, and headings of an aircraft from a given origin and a destination without human intervention. The dual agent system may be used to assist and guide a pilot during emergency situations. For example, the computed velocities, altitudes, and headings can be translated into control action that may be performed by the pilot to guide the aircraft to a calculated emergency destination. DARLAS may be used to assist and guide a pilot to a destination while minimizing cost.

The systems described herein may rely on a deep Q network to enable model free deep Q learning for obtaining complete reward-based mappings. The mappings may be used to determining a course of action during a flight as well as during an emergency. As a brief overview of deep Q learning, as it is applied herein, the dual agent system determines actions for the flight to reach the predetermined destination as well as actions for arriving at the predetermined destination with maximum efficiency. During an emergency, the dual agent system may also determine a candidate goal (which for example may include determining a safe landing location). The dual agent system may also have access to a user policy, which may be based on aircraft flight constraints, a flight envelope, maps of acceleration and deceleration, rate of climb, and rate of drop. The user policy effectively describes the possible actions that may be taken at any given time within the aircraft. Based on these parameters, the dual agent system may iteratively map a sequence of possible actions to bring the aircraft to a predetermined destination as well as iteratively map a sequence of possible actions to minimize cost to bring the aircraft to the predetermined destination. A loss function may be used to iteratively map both sequences of possible actions to ensure the sequence of possible actions will be both successful in bringing the aircraft to the predetermined destination while minimizing cost. In the event of a conflict, the dual agent system may prioritize the sequence of possible actions directed to bring the aircraft to a predetermined destination, or in the event of an emergency, a calculated emergency destination.

A safe reward Q value and cost Q value may be assigned at each iteration of the sequence. A value of the Q values may be equal to or fall between 0.0 and 1.0. If the sequence is successful in bringing the aircraft to the candidate goal (i.e., if the sequence will result in the aircraft landing safely at the predetermined destination or calculated emergency destination) then a high safe reward Q value (e.g., 1.0) may be assigned. If the sequence is not successful then a low safe reward Q value (e.g., 0.0) may be assigned. As each sequence may branch at each iteration the safe reward Q values may increase or decrease throughout the iterations depending on the likelihood of a safe landing at any given point in the sequence of actions. Likewise, if the sequence is successful in minimizing cost to arrive at the candidate goal (i.e., minimizing cost to land at the predetermined destination or calculated emergency destination) then a high cost reward Q value (e.g., 1.0) may be assigned. If the sequence is not successful then a low cost reward Q value (e.g., 0.0) may be assigned. As each sequence may branch at each iteration the safe reward Q values may increase or decrease throughout the iterations depending on the likelihood of minimizing cost at any given point in the sequence of actions.

The dual agent system may interact with an aircraft environment and pilot to select actions in a way that approximately maximize future safe reward values and cost reward values. Both agents of DARLAS are configured to calculate reward Q values based on state-action vectors associated with the aircraft. The state-action vectors include state data associated with the aircraft and action data associated with the aircraft. During the system calculations, because future states cannot be perfectly determined, a standard assumption that future rewards may be discounted by a set factor per time-step may be employed. A future discounted return $R_t$ may be calculated as follows:

$$R_t = \sum_{t'=t}^{T} \gamma^{t'-t} r_{t'}$$

where T is the flight duration, t' is the current time step, t is the next time step in the iteration, $\gamma$ is the discount factor, and $r_{t'}$ is the current discounted return. For the examples described herein, $\gamma$ was set to 0.99. However, other values are possible.

The safe agent and the cost agent each chooses an action according to the current estimation of the Q-function Q(s, a) in an iterative fashion. Both the safe agent and the cost agent use a state-action vector associated with aircraft to choose the action. The state-action vector includes state data associated with the aircraft and action data also associated with the aircraft. The state-action vector is iteratively updated.

Based on Q(s, a), the cost agent will choose the action that is associated with the highest safe reward Q value. Q-learning iteratively updates the action-section policy using the Bellman equation, which is known with respect to deep Q learning. The Q learning may iteratively update the action-selection policy using Q(s, a)=r+$\gamma$ max a' Q(s', a') where s and a are the current state and action and $\gamma$ represents the discount factor.

In regard to the safe agent, the deep Q network receives as an input a message from the cost agent. The resulting Bellman equation becomes Q(s, a, m) with m denoting the message from the cost agent. To reach the Bellman optimality, joint sampling of the cost agent and the safe agent are performed, and the samples are used to update all parameters by jointly minimizing the loss with a loss function. An example loss function that may be used is $L=E[Q(s_t, a_t)-(r_t+\gamma \max_{a'} Q(s_t+1, a'))]^2$. A common action state vector is then generated for the next iteration by minimizing the loss function. The common action state vector may be used to update the current state of both the cost agent and the safe agent. Intuitively, the loss function enables a unique state vector for that provides for a joint maximum safe Q reward and cost Q reward. In the event the loss function does not converge, then the safe agent will prevail. Such an event may occur in an emergency situation.

FIG. 1 is schematic that shows a first training phase of the dual agent reinforcement learning based system for autonomous operating of an aircraft or pilot assistance system (DARLAS). The training may take place in two phases, namely, training the model based on input from a pilot in a simulator and based on automated scenarios without a pilot present as discussed herein. In a training first phase 5, a pilot 20 provides input to a simulator 10 via an aircraft control interface 11. The simulator 10 includes various models, such as but not limited to environment models 12, aircraft models 13, and aircraft system models 14. The reinforced learning (RL) agents (safe and cost) 30 are trained based on the actions of the pilot 20 performed in the simulator 10.

Figure 2:
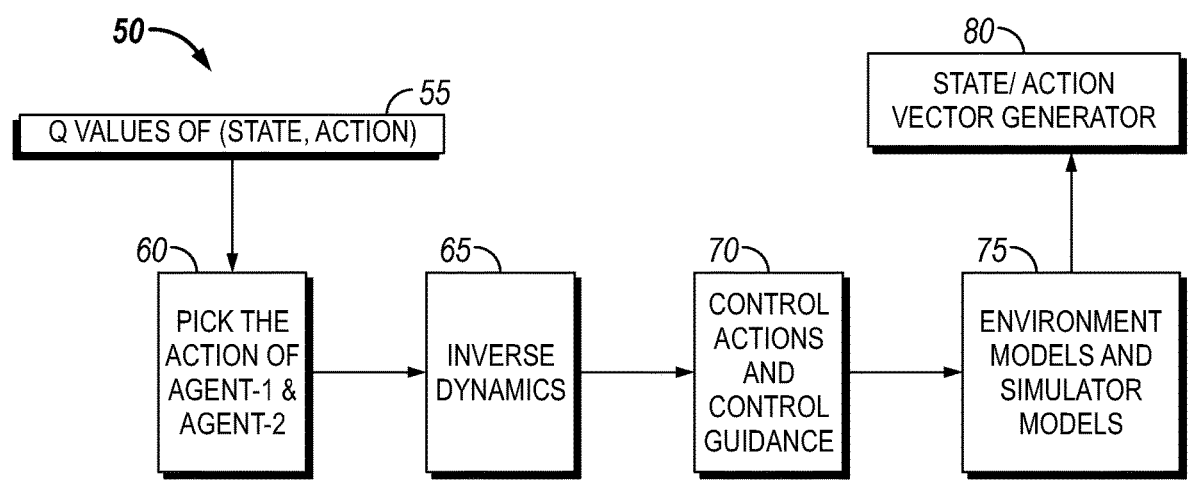
FIG. 2 is flow diagram showing an example agent training algorithm.

FIG. 2 is a flow diagram showing an example agent training algorithm 50. In the dual agent reinforcement learning, the two agents (safe and cost) share the same environment, but each agent has its own goals that it is trying to achieve. The dual agents both interact with the environment as well as with each other. Both agents are configured to calculate reward Q values based on state-action vectors of an aircraft. The safe agent is configured to calculate the highest Q value (i.e., the highest safe Q value) associated with landing the aircraft at a predetermined destination, or in the event of an emergency, landing at a calculated emergency destination. The cost agent is configured to calculate the highest Q value (i.e., the highest cost Q value) associated with minimizing cost of the aircraft to arrive at a destination.

The training algorithm 50 determines the safe Q value and cost Q value based on the state and action of the aircraft, at 55. The training algorithm 50 next determines (e.g. picks the action based on the safe Q value from the safe agent and the cost Q value from the cost agent) an aircraft surface control action determined from the dual agents, at 60. The training algorithm 50 translates the aircraft surface control action using an inverse aircraft model, at 65. Based on both control actions and control guidance 70 and environment models and simulator models 75, the training algorithm 50 generates state and action vectors, at 80.

Figure 3:
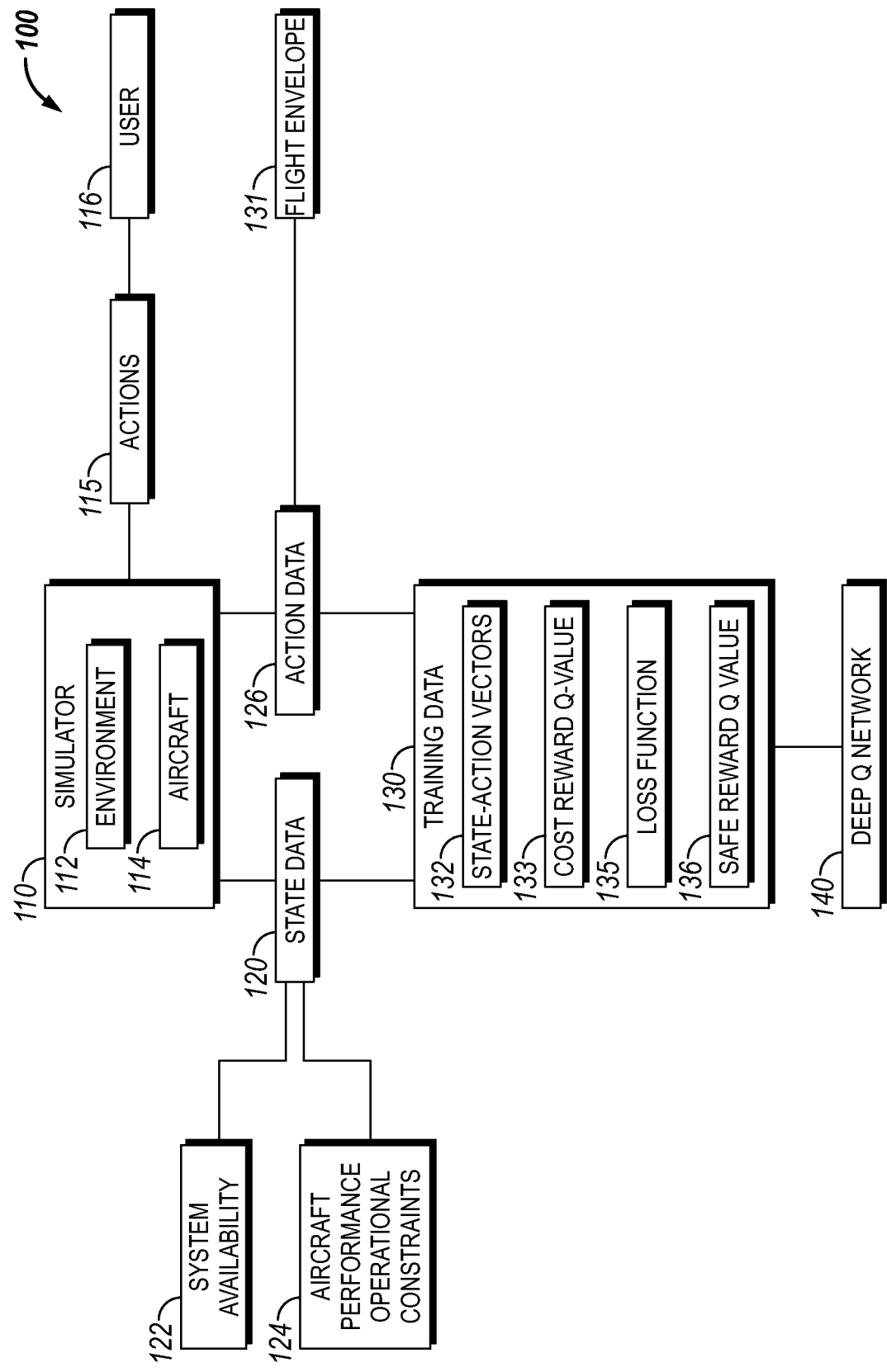
FIG. 3 is a block diagram depicting an example of a system for training an artificial neural network in a first training phase.
Figure 4:
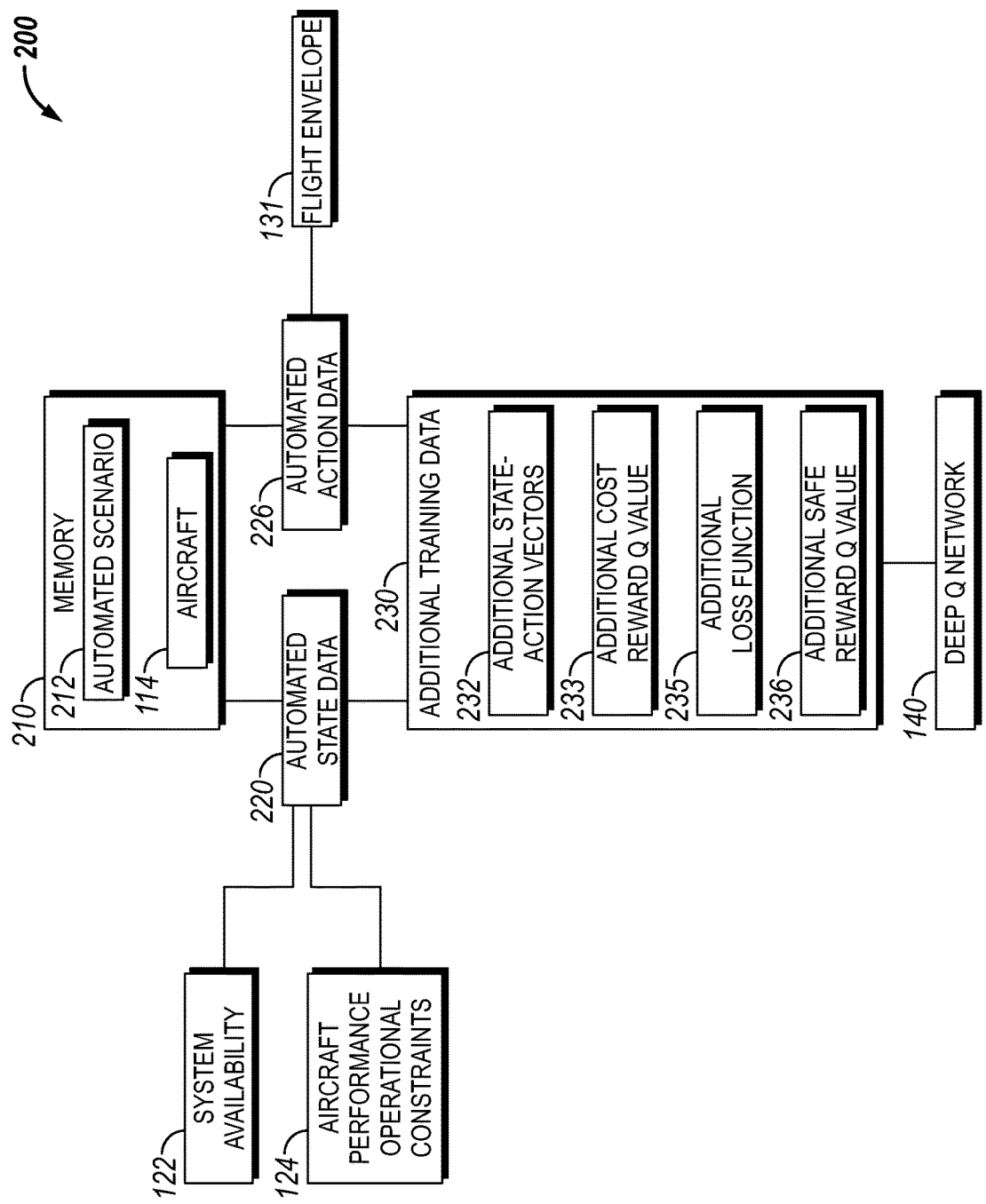
FIG. 4 is a block diagram depicting an example of a system for training an artificial neural network in a second training phase.

FIGS. 3 and 4 depict systems for training an artificial neural network for use with DARLAS. As discussed herein, training the artificial neural network may take place in two phases. A first phase may include training the model based on input from a pilot in a simulator and making determinations of whether outcomes during emergency training scenarios are successful. During the second phase, the model may be trained based on automated scenarios without a pilot present.

During the first phase, training of the artificial neural network may be performed along with training a pilot in a training simulator. The system may learn end-to-end mappings of aircraft flight paths (e.g., velocities, altitudes, and headings) from environmental observation and user input with the task reward, e.g., a safe landing, as a form of supervision. The safe reward may be calculated based on safely landing the aircraft at a desired location or at a calculated emergency landing location. The cost reward may be calculated based on minimizing cost to arrive at a desired location or at a calculated emergency landing location. Common state-action vectors based on the safe reward and the cost reward may be determined based on a loss function. From the perspective of the system being trained, the pilot's actions may be incorporated into a policy that also includes constraints such as a flight envelope, maps of acceleration and deceleration, a rate of climb, a rate of drop and others policy data for a safe flight. From the pilot's perspective, the system may behave like an adaptive interface that learns a personalized mapping from the pilot's commands, environments, goal space and flight constraint policy to action of flight path and its other parameters.

Figure 5A:
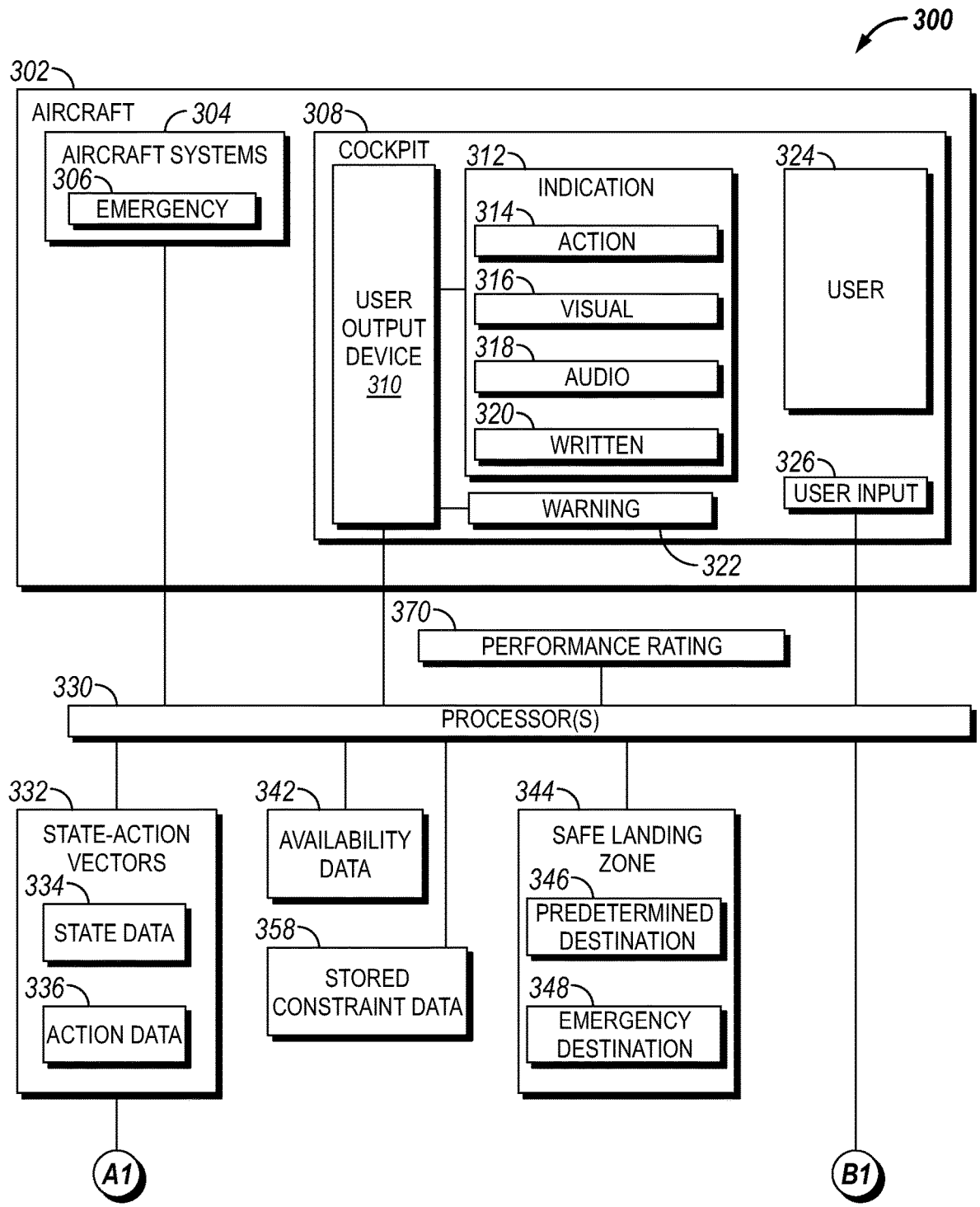
FIGS. 5A and 5B are a block diagram depicting an example of a dual agent reinforcement learning based system for autonomous operating of an aircraft or pilot assistance system in a first iteration.
Figure 5B:
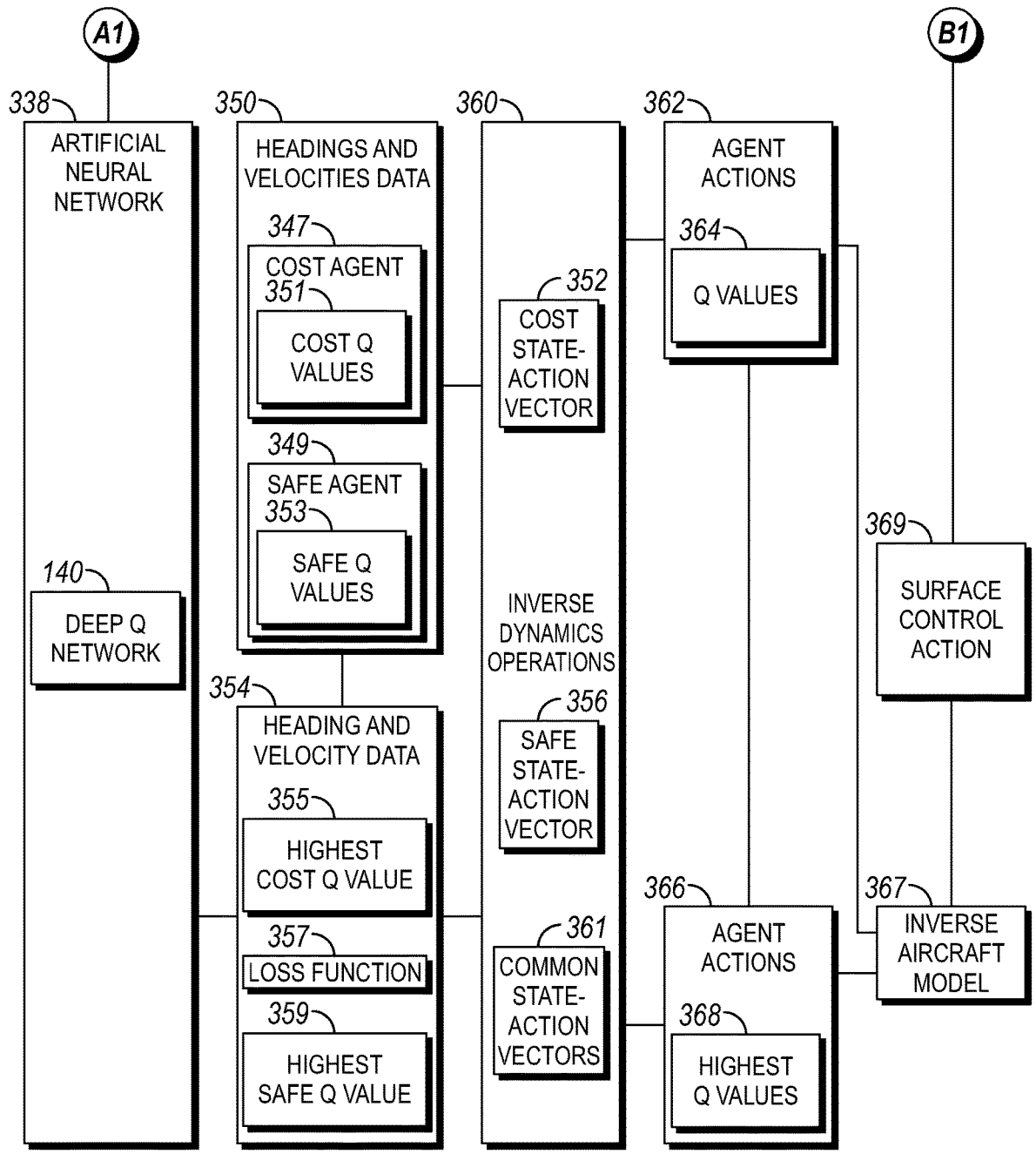

Referring to FIG. 3, an example of a system 100 for training an artificial neural network in a first training phase is depicted. The system 100 may include a simulator 110 and a deep Q network 140. It should be understood by persons of skill in the art, having the benefit of this disclosure, that the deep Q network 140 may be implemented as part of a broader artificial neural network as described further with reference to FIGS. 5A and 5B (Collectively, FIG. 5). The simulator 110 may simulate an aircraft 114 and an environment 112 of the aircraft during pilot training of a user 116.

During operation, while the user 116 is performing training exercise in the simulator 110, state data 120 associated with the aircraft 114 and with the environment 112 of the aircraft 114 may be collected from the simulator 110. The state data 120 may indicate a current state of the aircraft 114 and the environment 112. A portion of the state data 120 may also be based on system availability 122 of the aircraft 114. For example, during an emergency one or more systems of the aircraft 114 may be inoperable or otherwise unavailable for use. These factors may be taken into account when generating the state data 120. The state data 120 may also be based on aircraft performance operational constraints 124, which may represent the limits of what a particular aircraft may do in a particular scenario being run at the simulator 110.

Action data 126 may also be collected from the simulator 110. The action data 126 may be derived from actions 115 taken by the user 116 during flight training. The action data 126 may also be based on a flight envelope 131, representing the actions that may be taken with respect to a particular aircraft.

Based on the state data 120 and the action data 126, training data 130 may be compiled. The training data 130 may include a set of state-action vectors 132 formed by combining the state data 120 and the action data 126 at incremental steps during the simulation. A safe reward Q value 136 and a cost reward Q value 133 may be determined based on an outcome associated with the set of state-action vectors 132, a loss function 135, and the discounted return function described herein. The training data 130 may also include the cost reward Q value 133 and the safe reward Q value 136 and may be used as training data for the deep Q network 140.

A challenge typically associated with training emergency assistance systems may be adapting standard deep reinforcement learning techniques that leverage continuous input from the actions 115 and making adjustments to the inputs based on a consequence of feedback associated with the actions 115. By using human-in-the-loop deep Q-learning, as described herein, with a user 116 actively using the simulator 110, the system 100 may learn an approximate state-action value function that computes expected future return values without computing each possible path in the state-action vectors 132 for an action given current environmental observation and the pilot's control input. Rather than finding a highest-value actions for both the safe agent and the cost agent, the deep Q network 140 may be trained to determine a closest high-value action to a user's input. This approach balances taking optimal actions with preserving a pilot's feedback control loop. This approach also enables the user 116 to directly modulate a level of assistance through a parameter $\alpha \epsilon [0, 1]$, which may set a threshold for tolerance for suboptimal actions.

Standard deep reinforcement learning algorithm may include a large number of interactions for a very long period in order to have sufficient training. Simulator training alone is likely to be insufficient because it may not be feasible to obtain enough data. During a second phase of training, pilot control input may be replaced with automated scenario files having fixed control inputs from various origins to various destinations. The automated scenario files may cover more of the operating condition of an aircraft during these scenarios. This automated training approach may also be useful for covering extreme emergency conditions, which may be difficult to simulate with a pilot. In some cases, this training will enable the system to determine a safe course of action more reliably than a pilot by learning based on a full-spectrum of input from each scenario and learning based on scenarios that have not yet been anticipated by pilots.

The remaining portions of the second phase of training may be the same as described with reference to FIG. 3. Deep Q-learning may be used to learn an approximate state-action value function that computes the expected future return of an action given the current environmental observation, policy constraint, and the automated scenario's input. Equipped with this value function, the dual agent system may execute the closest high-value action to the scenario's control input. The reward function for the agent may be a combination of known terms computed for every state, and a terminal reward provided by the user upon succeeding in landing the plane safely.

Referring to FIG. 4, an example of a system 200 for training an artificial neural network in a second training phase is depicted. The system 200 may include a memory 210 and a deep Q network 140. The memory 210 may store an automated scenario 212 associated with an aircraft 114. In practice, many automated scenarios would be stored in the memory 210.

The memory 210 may include memory devices such as random-access memory (RAM), read-only memory (ROM), magnetic disk memory, optical disk memory, flash memory, another type of memory capable of storing data and processor instructions, or the like, or combinations thereof. Further, the memory may be part of a processing device (not shown in FIG. 4) such as a computing device.

During operation, automated state data 220 associated with the aircraft 114 and with the automated scenario 212 may be collected. In some examples, the collection may take the form of multiple automated scenario files. The automated state data 220 may indicate a current state of the aircraft 114 during the automated scenario 212. A portion of the automated state data 220 may also be based on system availability 122 of the aircraft 114 and on aircraft performance operational constraints 124, as described with reference to FIG. 3. Automated action data 226 may also be derived from the automated scenario 212 and a flight envelope 131, representing the actions that may be taken with respect to the aircraft 114.

Based on the automated state data 220 and the automated action data 226, additional training data 230 may be compiled. The additional training data 230 may include an additional set of state-action vectors 232 formed by combining the automated state data 220 and the automated action data 226. An additional cost reward Q value 233 and an additional safe reward Q value 236 may be determined based on an outcome associated with the additional set of state-action vectors 232, an additional lost function 235, on the discounted return function described herein. The additional training data 230 may include the additional cost reward Q value 233 and the additional safe reward Q value 236 and may be used to train the deep Q network 140.

While FIG. 4 is described with respect to a single automated scenario 212, in practice many scenarios may be stored in the memory 210 and may be used to generate the additional training data 230. Because the additional training data 230 is not compiled based on real time situations, it may be generated much faster, thereby enabling sufficient training data to be generated to fully train the deep Q network 140. By using both pilot simulator generated data and automated scenario data, the deep Q network 140 may be trained to learn realistic pilot responses for a complete set of emergency scenarios.

Referring to FIGS. 5 and 6, the deep Q network 140 may be implemented in an example of a dual agent reinforcement learning autonomous system 300 to autonomously operate an aircraft and/or assist a pilot during flight to a predetermined destination or an emergency. As a brief overview, the system 300 may determine a state of an aircraft 302. The state may relate to factors such as whether the aircraft is landing, approaching, or climbing. Other possible states may exist. Likewise, the system 300 may analyze the onboard system availability of the aircraft 302 to determine availability data 342. The system availability may relate to potential engine failure, surface control failure, fuel availability, and structural integrity. Based on the system availability and aircraft situational condition, the system 300 may determine actions to reach a predetermined destination efficiently to minimize cost. Likewise, based on the system availability and aircraft situational condition, the system 300 may determine a calculated emergency destination and guide the pilot on maneuvers during an emergency situation. Based on the current system state and aircraft current feedback the system 300 may estimate near-optimal trajectories to the safe landing destination. The system 300 may continuously evaluate the situation to guide the pilot to necessary action to safely reach a destination while minimizing cost.

The system 300 may include, or otherwise be implemented at, an aircraft 302. The system may also include one or more processors 330, which may be implemented at the aircraft 302 or in some examples, may be distributed in a decentralized manner. The system 300 may also include an artificial neural network 338. Portions of the system 300 may be implemented at the one or more processors 330. However, for clarity different functional aspects of the system 300 may be depicted as separate from the processors 330.

The aircraft 302 may include aircraft systems 304 and a cockpit 308. The aircraft systems 304 may include mechanical systems, electrical systems, sensors, actuators, and the like. At least some of the aircraft system 304 may be able to determine the existence of an emergency 306. The cockpit 308 may include a user output device 310. The user output device 310 may include visual output systems, audio output systems, text output systems, and the like. The aircraft 302 may include additional systems to perform functions typically associated with aircraft, but which are omitted from FIGS. 5A and 5B for clarity.

The one or more processors 330 may include a microcontroller, a central processing unit (CPU), a graphical processing unit (GPU), a digital signal processor (DSP), a peripheral interface controller (PIC), another type of microprocessor, and/or combinations thereof. Further, the one or more processors 330 may be implemented as integrated circuits, complementary metal-oxide-semiconductor (CMOS) field-effect-transistor (MOSFET) circuits, very-large-scale-integrated (VLSI) circuits, field-programmable gate arrays (FPGAs), application-specific integrated circuit (ASICs), combinations of logic gate circuitry, other types of digital or analog electrical design components, or combinations thereof.

The artificial neural network 338 may include the deep Q network 140 and may be trained as described herein. In particular, the artificial neural network may be trained to perform an approximation function to determine safe reward Q values and cost reward Q values associated with states and possible actions associated with the aircraft 302. It should be understood by persons of skill in the art, having the benefit of this disclosure, that the artificial neural network 338 may be a broader network, of which the deep Q network 140 may be a part.

During operation, the one or more processors 330 may determine state data 334 and action data 336 based on the aircraft systems 304. For example, the state data 334 may include a matrix of aircraft heading, positions and velocity, current state, environmental condition, feedbacks, pilot action, aircraft system availability such as current value roll, pitch, yaw, rate of change of roll, pitch and yaw, longitude and latitude, rate of change of position, velocity, other state parameters associated with the aircraft 302, or combinations thereof. The action data 336 may be based on heading and velocity such as the value of roll, pitch, yaw, rate of change of roll, pitch and yaw, rate of change of position, and velocity. State-action vectors 332 may be generated based on the state data 334 and the action data 336.

The processors 330 may determine and/or compile availability data related to the aircraft systems 304. For example, in an emergency 306, some systems may not be available. A calculated safe landing zone 344 may be determined based on the state data 334 and based on the availability data 342. The calculated safe landing zone 344 may be a predetermined destination 346 or, in some cases, an emergency destination 348 may be determined based on a location of the aircraft 302 and based on the availability data 342 and stored constraint data 358 associated with the aircraft 302. The action data 336 may depend on the calculated safe landing zone 344, the availability data 342, the state data 334, and stored constraint data 358.

The artificial neural network 338 may be used to determine headings and velocities data 350 that may be associated with calculated cost Q reward values 351 and safe reward Q values 353. The cost reward Q values 351 may be determined by the cost agent 347 based on the state-action vectors 332 and may be associated with landing the aircraft 302 most efficiently at a predetermined destination 346 or at the calculated safe landing zone 344. The safe reward Q values 353 may be determined by the safe agent 349 based on the state-action vectors 332 and may be associated with landing the aircraft 302 safely at a predetermined destination 346 or at the calculated safe landing zone 344. For example, the higher the safe reward Q values 353 are, the more likely a safe landing is to occur. From the headings and velocities data 350, heading and velocity data 354 may be associated with a highest cost reward Q value 355 and a highest safe reward Q value 359 as determined by the artificial neural network 338. The cost agent 347 calculates a cost state-action vector 352 based on the highest cost reward Q value 355. The safe agent 349 calculates a highest safe reward Q value 359 based on the state-action vectors 332 associated with the aircraft 302 and based on the cost state-action vector 352. The highest safe reward Q value 359 is associated with landing the aircraft at a predetermined destination or a calculated emergency destination in response to an emergency. The safe agent 349 calculates a safe state-action vector 356 based on the highest safe reward Q value 359. As discussed herein, a loss function 357 may be used to determine a unique state vector for that provides for a joint maximum safe Q reward 355 and cost Q reward 359.

One or more inverse dynamics operations 360 may be performed to translate the heading and velocity data 354 into an agent action 366. Further, in some examples, additional data from the headings and velocities data 350 may be translated into agent actions 362. Each of the agent actions 362 may be associated with reward Q values 364, which may correspond to the safe reward Q values 351 and cost reward Q values 353. The agent action 366 may be associated with a highest reward Q value 368 that corresponds to the highest joint maximum cost Q reward value 355 and safe Q reward value of the heading and velocity data 354. An inverse aircraft model 367 may be used to translate the agent action 366 into a surface control action 369 that may be usable as instructions to the user 324 to guide the aircraft 302.

Within the cockpit 308, the user output device 310 may provide an indication 312 of an action 314 to the user 324. The action 314 may correspond to the agent action 366 and may also be, or may be derived from, the surface control action 369. The indication 312 of the action 314 may include a visual indication 316, an audio indication 318, a written indication 320, or any combination thereof. If the user 324 does not perform the action 314, then the user output device 310 may generate a warning 322. The user may perform actions using user input 326, which may include flight controls and/or other controls associated with aircraft cockpits. In cases where, there is no emergency, the system 300 may nevertheless generate a performance rating 370 associated with a flight based on comparing the agent actions 362 generated by the artificial neural network 338 to the user input 326. Alternatively, the system 300 may autonomously operate the aircraft 302 using the surface control action 369.

Figure 6A:
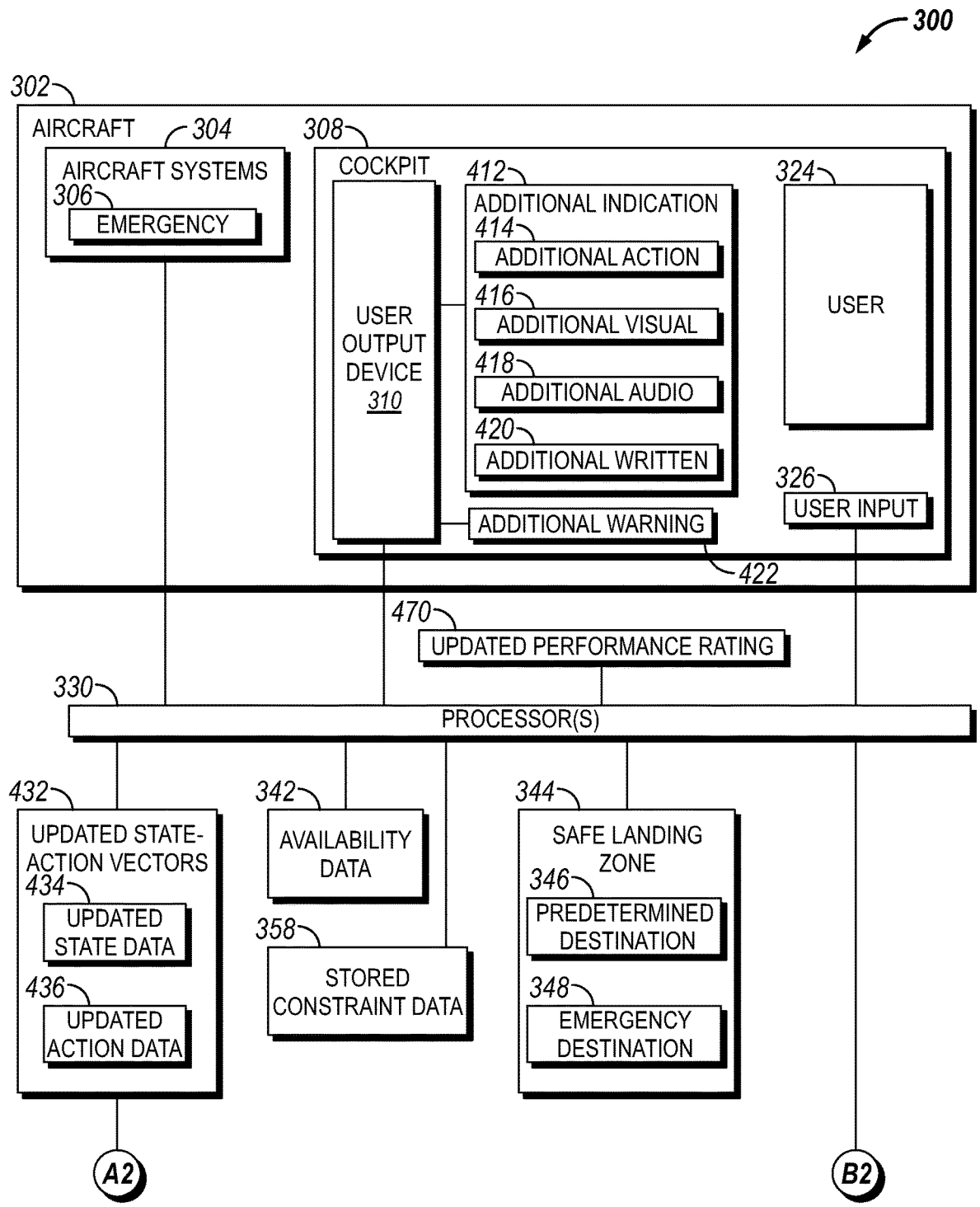
FIGS. 6A and 6B are a block diagram depicting an example of a dual agent reinforcement learning based system for autonomous operating of an aircraft or pilot assistance system in a second iteration.
Figure 6B:
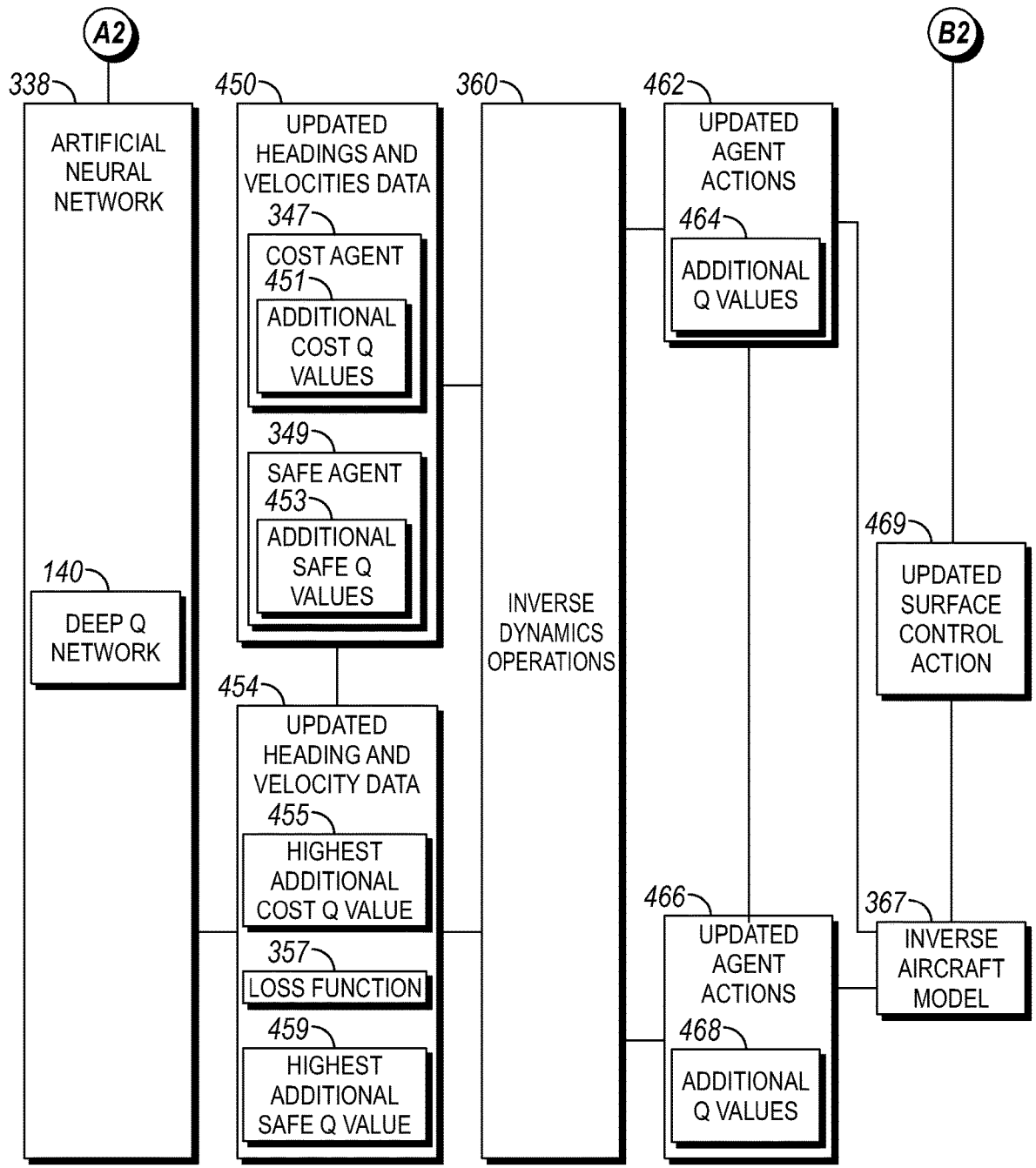

It should be noted that the process described with respect to the system 300 is iterative and may be continually performed during a flight and/or during an in-flight emergency. Thus, agent actions may be continually fed to the output device 310 as the state-action vectors 332 change. Referring to FIGS. 6A and 6B (Collectively FIG. 6), this continual update is depicted. As the aircraft 302 changes its vectors and as the availability data 342 changes based on the aircraft systems 304 during the emergency 306, updated state-action vector 432 may be generated. The updated state-action vectors 432 may include updated state data 434 and updated action data 436.

The artificial neural network 338 may be used to generate updated headings and velocities data 450, which may be associated with additional cost reward Q values 451 and additional safe reward Q values 453. The updated heading and velocity data 454 that is associated with the highest additional reward cost Q value 455 and highest additional safe reward Q value 459 may be determined to safely guide the user 324 to land at the predetermined destination 346 or the calculated safe landing zone 344. As discussed herein, a loss function 357 may be used to determine a unique state vector for that provides for an additional joint maximum highest additional cost Q reward 455 and highest additional safe Q reward 459. Based on the updated headings and velocities data 450, updated agent actions 462 may be generated and associated with additional reward Q values 464, which may correlate with the additional reward Q values of the updated headings and velocities data 450. An updated agent action 466 may be associated with a highest additional reward Q value 468, which may correlate with the highest additional reward Q value 455 of the updated heading and velocity data 454. The updated agent action 466 may be used to generate an updated surface control action 469.

The user output device 310 may be configured to provide an additional indication 412 of an additional action 414 to the user 324. The additional indication 412 may include an additional visual indication 416, an additional audio indication 418, an additional written indication 420, or any combination thereof. If the user 324 does not perform the additional action 414, an additional warning 422 may be generated. As before, an updated performance rating 470 may be generated based on comparing the user input 326 to the updated agent actions 462.

By providing indications of actions that a pilot can take to safely land an aircraft at a calculated emergency destination, the system 300 may reduce the workload on the pilot in case of an emergency. Further, the system 300 may warn pilot when the pilot's actions may lead to on such action which can lead into catastrophic failure. Also, even in cases where there is no emergency, the system 300 can, nevertheless, rate a pilot's performance for training purposes. As discussed herein, in some examples the system 300 may autonomously operate the aircraft 302 using the surface control action 369. Other advantages may exist.

Figure 7:
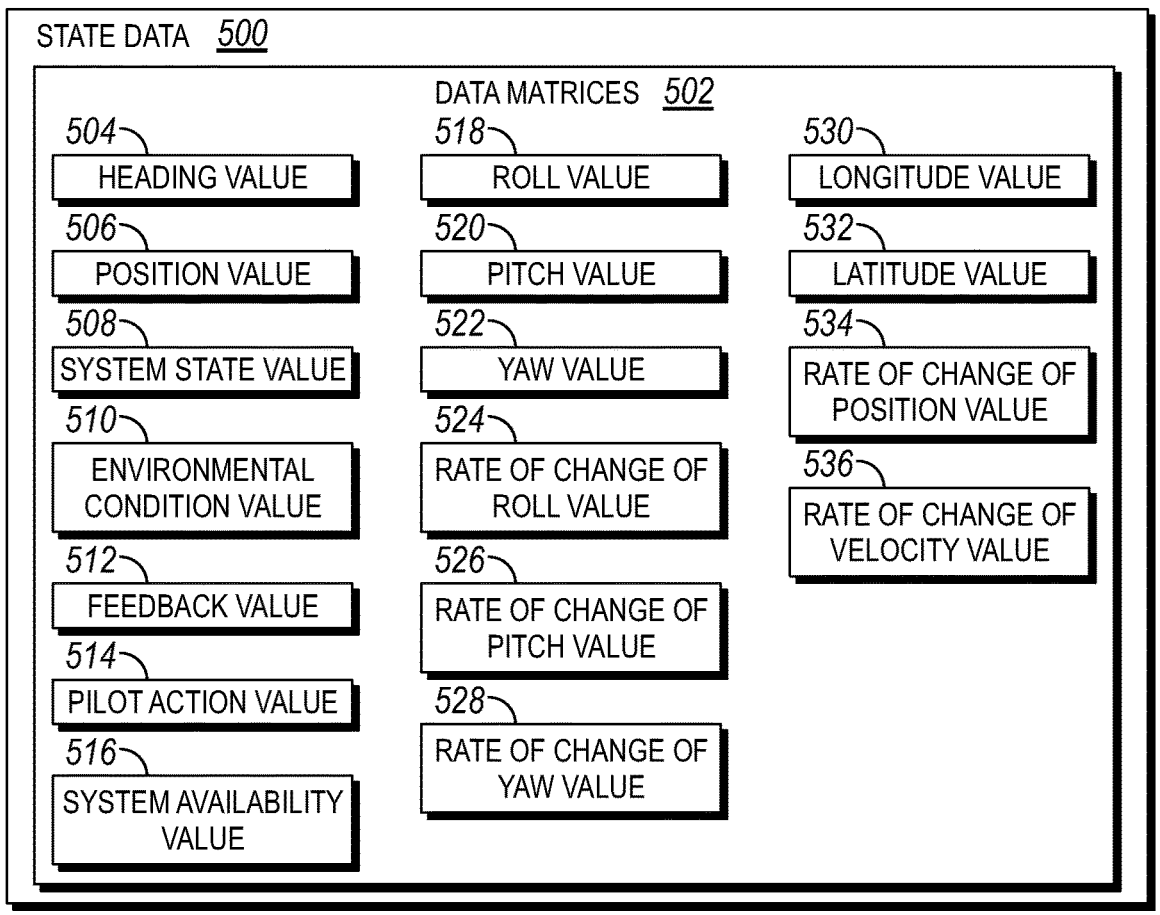
FIG. 7 is a block diagram depicting an example of state data.

Referring to FIG. 7, an example of state data 500 is depicted. The state data 500 may include data matrices 502 associated with an aircraft, such as the aircraft 302, the data matrices 502 may indicate a heading value 504, a position value 506, a system state value 508, an environmental condition value 510, a feedback value 512, a pilot action value 514, a system availability value 516, a roll value 518, a pitch value 520, a yaw value 522, a rate of change of roll value 524, a rate of change of pitch value 526, a rate of change of yaw value 528, a longitude value 530, a latitude value 532, a rate of change of position value 534, a rate of change of velocity value 536, or any combination thereof. The state data 500 may correspond to the state data 120, the automated state data 220, the state data 334, and/or the updated state data 434.

Figure 8:
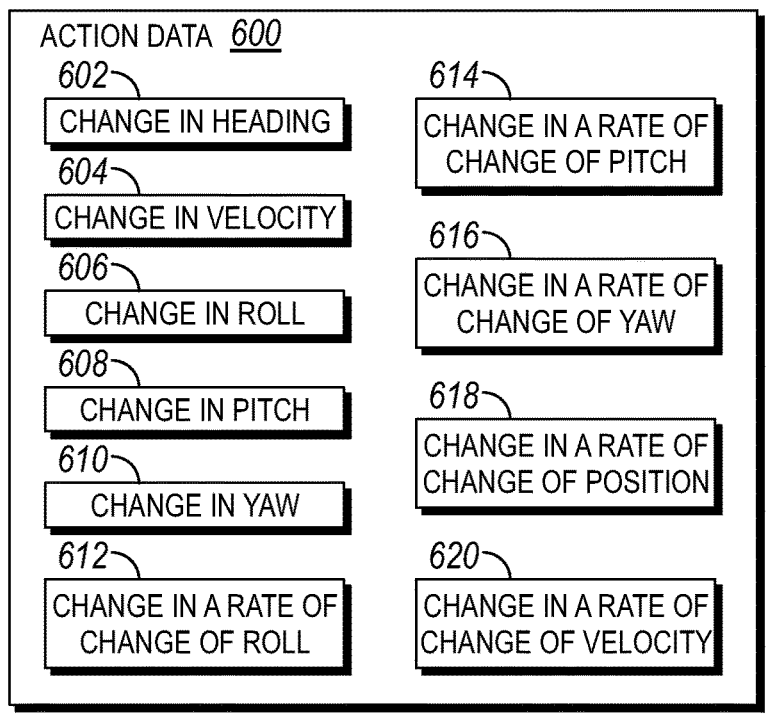
FIG. 8 is a block diagram depicting an example of action data.

Referring to FIG. 8, an example of action data 600 is depicted. The action data 600 may include a change in heading 602, a change in velocity 604, a change in roll 606, a change in pitch 608, a change in yaw 610, a change in a rate of change of roll 612, a change in a rate of change of pitch 614, a change in a rate of change of yaw 616, change in a rate of change of position 618, a change in a rate of change of velocity 620, or any combination thereof. The action data 600 may correspond to the action data 126, the automated action data 226, the action data 336, and/or the updated action data 436.

Figure 9:
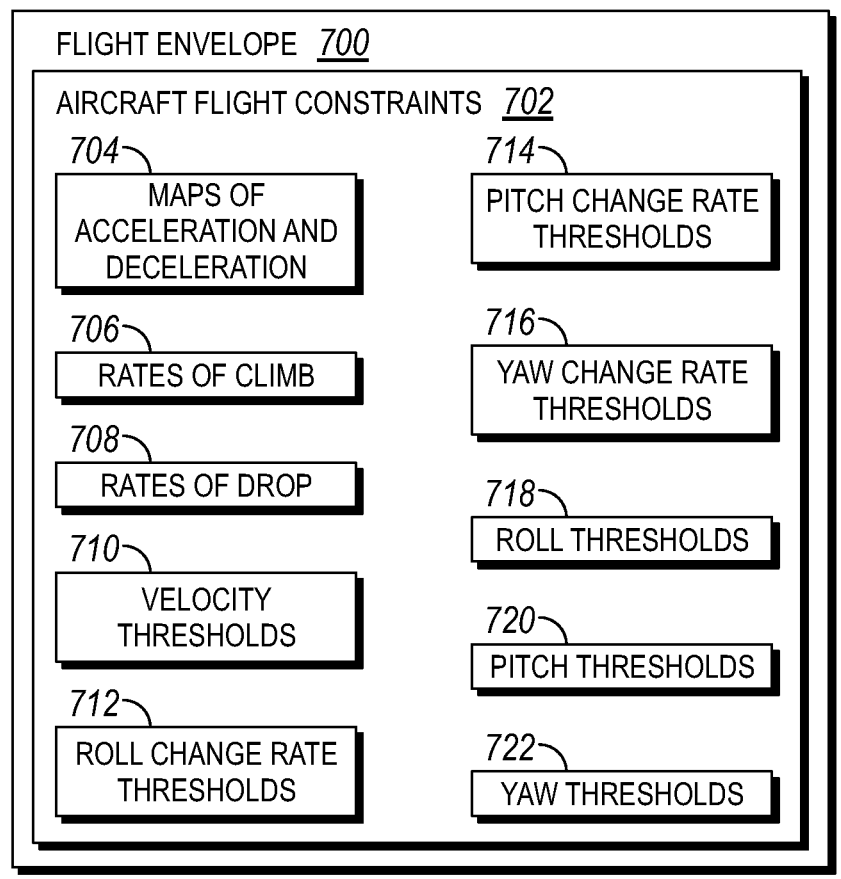
FIG. 9 is a block diagram depicting an example of a flight envelope.

Referring to FIG. 9, an example of a flight envelope 700 is depicted. The action data 336 may be based at least partially on the flight envelope 700. The flight envelope 700 may include aircraft flight constraints 702. The aircraft flight constraints 702 may include maps of acceleration and deceleration 704, rates of climb 706, rates of drop 708, velocity thresholds 710, roll change rate thresholds 712, pitch change rate thresholds 714, yaw change rate thresholds 716, roll thresholds 718, pitch thresholds 720, and yaw thresholds 722.

Figure 10:
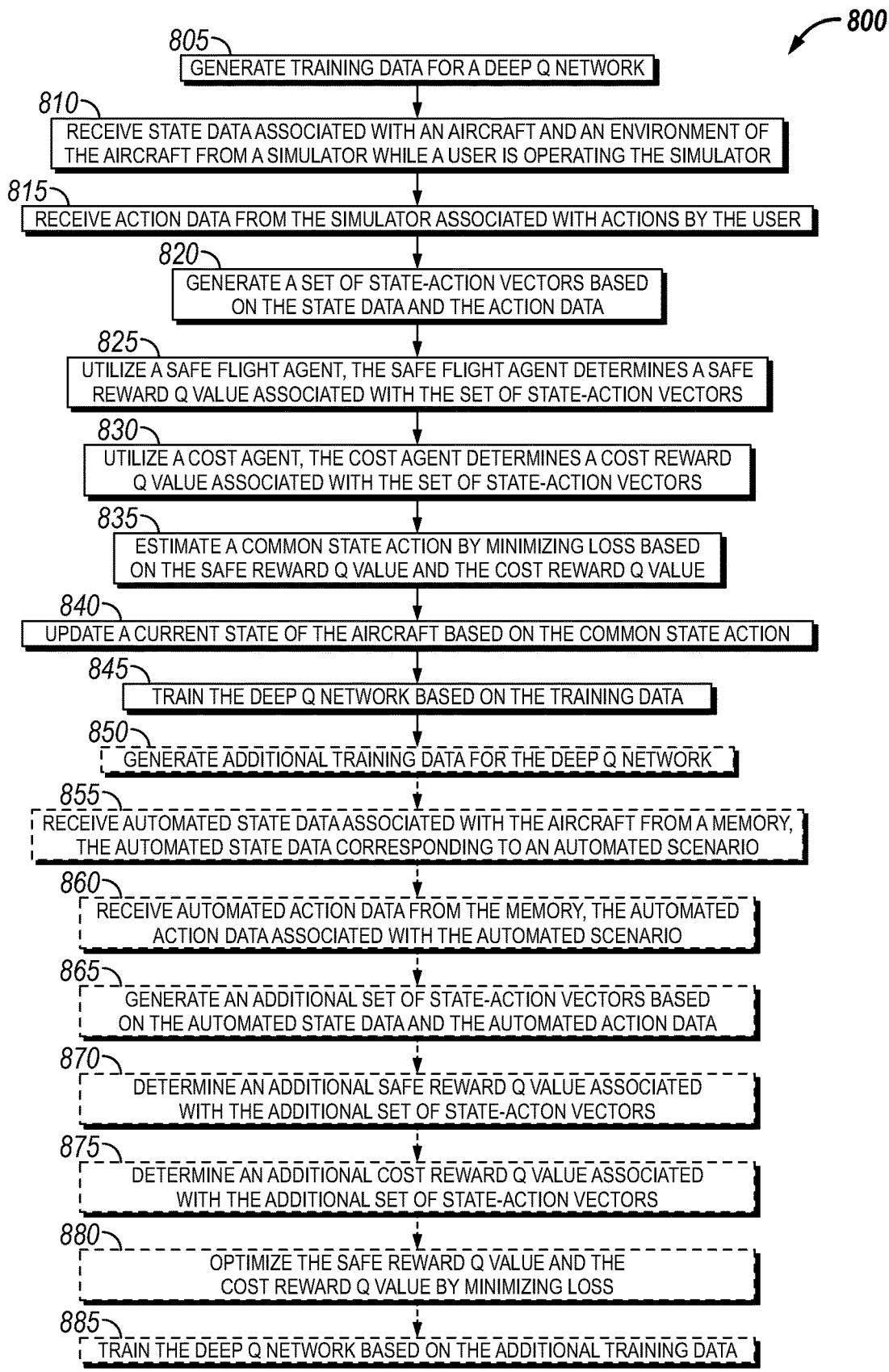
FIG. 10 is a flow chart depicting an example of a method for training an artificial neural network.

Referring to FIG. 10, a flow chart depicting an example of a method 800 for training an artificial neural network for a pilot assistance system. The method 800 includes generating training data for a deep Q network, at 805. For example, training data may be generated in a first training phase using human-in-the-loop deep Q-learning based on actions a pilot makes in a simulator or may be generated in a second training phase based on automated scenarios. The method 800 includes receiving state data associated with an aircraft and an environment of the aircraft from a simulator while a user is operating the simulator, at 810. The method 800 includes receiving action data from the simulator associated with actions by the user, at 815. The method 800 includes generating a set of state-action vectors based on the state data and the action data, at 820.

The method 800 includes utilizing a safe agent, the safe agent determines a safe reward Q value associated with the set of state-action vectors, at 825. The method 800 includes utilizing a cost agent, the cost agent determines a cost reward Q value associated with the set of state-action vectors, at 830. The method 800 includes estimating a common state action by minimizing loss based on the safe reward Q value and the cost reward Q value, at 835. The method 800 includes updating a current state of the aircraft based on the common state action, at 840. The method 800 includes training the deep Q network on the training data, at 845.

The method 800 may include generating additional training data for the deep Q network, at 850. The method 800 may include receiving automated state data associated with the aircraft from a memory, the automated state data corresponding to an automated scenario, at 855. The method 800 may include receiving automated action data from the memory, the automated action data associated with the automated scenario, at 860. The method 800 may include generating an additional set of state-action vectors based on the automated state data and the automated action data, at 865.

The method 800 may include determining an additional safe Q reward value associated with the additional set of state-action vectors, at 870. The method 800 may include determining an additional cost reward Q value associated with the additional set of state-action vectors, at 875. The method 800 may include optimizing the safe reward Q value and the cost reward Q value by minimizing loss, at 880. The method 800 may include training the deep Q network based on the additional training data, at 885.

Figure 11:
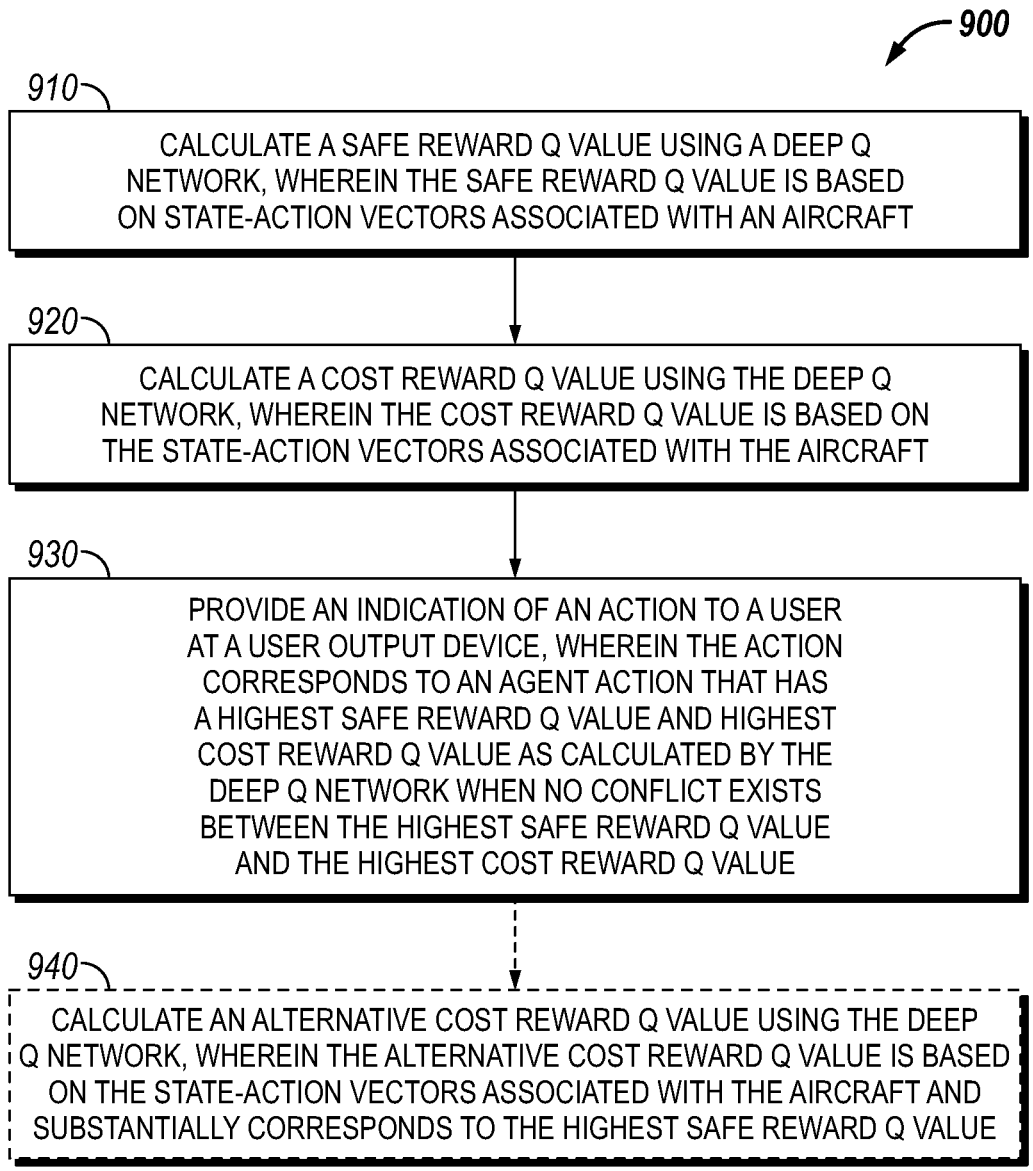
FIG. 11 is a flow chart depicting an example of a method for emergency pilot assistance.

FIG. 11 is a flow chart of an example an emergency pilot assistance method 900. The method 900 includes calculating a safe reward Q value using a deep Q network, wherein the safe reward Q value is based on state-action vectors associated with an aircraft, at 910. The method 900 includes calculating a cost reward Q value using the deep Q network, wherein the cost reward Q value is based on the state-action vectors associated with the aircraft, at 920. The method 900 includes providing an indication of an action to a user at a user output device, wherein the action corresponds to an agent action that has a highest safe reward Q value and highest cost reward Q value as calculated by the deep Q network when no conflict exists between the highest safe reward Q value and the highest cost reward Q value, at 930. The method 900 may include calculating an alternative cost reward Q value using the deep Q network, wherein the alternative cost reward Q value is based on the state-action vectors associated with the aircraft and substantially corresponds to the highest safe reward Q value, at 940.

Although various examples have been shown and described, the present disclosure is not so limited and will be understood to include all such modifications and variations as would be apparent to one skilled in the art.

What is claimed is:

1. A system comprising:
an artificial neural network;
a cost agent configured to calculate a highest cost reward Q value based on state-action vectors associated with an aircraft, the highest cost reward Q value is associated with maximum fuel efficiency and aircraft performance, wherein the cost agent calculates a cost state-action vector based on the highest cost reward Q value;
a safe agent configured to receive, as an input, a message from the cost agent and calculate a highest safe reward Q value based on the state-action vectors associated with the aircraft and based on the cost state-action vector, the highest safe reward Q value is associated with landing the aircraft at a predetermined destination or a calculated emergency destination in response to an emergency, wherein the safe agent calculates a safe state-action vector based on the highest safe reward Q value;
wherein the state-action vectors include state data associated with the aircraft and action data associated with the aircraft;
wherein the artificial neural network determines an agent action based on the safe state-action vector and the cost state-action vector; and
a user output device positioned within a cockpit of the aircraft and configured to provide an indication of an action to a user while the user is controlling the aircraft, wherein the action corresponds to the agent action as determined by the artificial neural network, and wherein the user output is configured to provide a warning to the user in response to the user not performing the action.

2. The system of claim 1, wherein both the safe agent iteratively updates the highest safe reward Q value and the cost agent iteratively updates the highest cost reward Q value based on a version of a Bellman equation.

3. The system of claim 2, wherein the cost state-action vector and the safe state-action vector include common state-action vectors based on a loss function.

4. The system of claim 3, wherein the artificial neural network is implemented at one or more processors, and wherein the one or more processors are further configured to:
determine heading and velocity data associated with minimized loss and optimized highest safe reward Q value and the highest cost reward Q value; and
perform one or more inverse dynamics operations to translate the heading and velocity data into the agent action.

5. The system of claim 1, wherein when the safe state-action vector substantially differs from the cost state-action vector the artificial neural network gives priority to the safe state-action vector.

6. The system of claim 1, wherein the state data include data matrices associated with the aircraft, the data matrices indicating a heading value, a position value, a system state value, an environmental condition value, a feedback value, a pilot action value, a system availability value, a roll value, a pitch value, a yaw value, a rate of change of roll value, a rate of change of pitch value, a rate of change of yaw value, a longitude value, a latitude value, a rate of change of position value, a rate of change of velocity value, or any combination thereof.

7. The system of claim 1, wherein the action data corresponds to a change in heading, a change in velocity, a change in roll, a change in pitch, a change in yaw, a change in a rate of change of roll, a change in a rate of change of pitch, a change in a rate of change of yaw, change in a rate of change of position, a change in a rate of change of velocity, or any combination thereof.

8. The system of claim 7, wherein the agent action is translated into an aircraft surface control action using an inverse aircraft model.

9. The system of claim 1, wherein the agent action is taken from a flight envelope including aircraft flight constraints, wherein the aircraft flight constraints include maps of acceleration and deceleration, rates of climb, rates of drop, velocity thresholds, roll change rate thresholds, pitch change rate thresholds, yaw change rate thresholds, roll thresholds, pitch thresholds, and yaw thresholds.

10. The system of claim 1, wherein the artificial neural network includes a deep Q network.

11. The system of claim 1, wherein the user output device is incorporated into a cockpit of the aircraft, and wherein the indication of the action includes a visual indication, an audio indication, a written indication, or any combination thereof.

12. The system of claim 1, wherein the artificial neural network is implemented at one or more processors, and wherein the one or more processors are further configured to:
determine the state data based on one or more aircraft systems;
determine availability data associated with one or more aircraft systems;
determine the calculated emergency destination based on the state data and based on the availability data in response to the emergency;
determine the action data based on the calculated emergency destination, the availability data, the state data, and stored constraint data; and
generate the state-action vectors based on the state data and the action data.

13. The system of claim 1, wherein the artificial neural network is implemented at one or more processors, and wherein the one or more processors are further configured to:
generate updated state-action vectors associated with the aircraft based on updated state data and updated action data; and
calculate an additional highest cost reward Q value based on the updated state-action vectors and calculate an additional highest safe reward Q value based on the update state-action vectors and the additional highest cost reward Q value, wherein the user output device is configured to provide an additional indication of an additional action to the user, wherein the additional action corresponds to an updated agent action that has the updated highest safe reward Q value and the updated highest cost reward Q value as calculated by the artificial neural network.

14. An emergency pilot assistance method comprising:
calculating a cost reward Q value using a cost agent associated with a deep Q network, wherein the cost reward Q value is based on state-action vectors associated with an aircraft;
calculating a safe reward Q value using a safe agent associated with the deep Q network, wherein the safe reward Q value is based on the state-action vectors associated with the aircraft and a message from the cost agent;

wherein the state-action vectors include state data associated with the aircraft and action data associated with the aircraft; and providing an indication of an action to a user at a user output device within a cockpit of the aircraft while the user is controlling the aircraft, wherein the action corresponds to an agent action that has a highest safe reward Q value and highest cost reward Q value as calculated by the deep Q network when no conflict exists between the highest safe reward Q value and the highest cost reward Q value, and wherein the user output is configured to provide a warning to the user in response to the user not performing the action.

15. The method of claim 14, further comprising:

generating training data for the deep Q network by:
receiving training state data associated with the aircraft and an environment of the aircraft from a simulator while a user is operating the simulator;
receiving training action data from the simulator associated with actions by the user;
generating a set of training state-action vectors based on the training state data and the training action data;
utilizing the safe agent, the safe agent determining a training safe reward Q value associated with the set of training state-action vectors;
utilizing the cost agent, the cost agent determining a training cost reward Q value associated with the set of training state-action vectors;
estimating a training common state action by minimizing loss based on the training safe reward Q value and the training cost reward Q value;
updating a current state of the aircraft based on the training common state action; and
training a deep Q network based on the training data.

16. The method of claim 15, further comprising:

generating additional training data for the deep Q network by:
receiving automated state data associated with the aircraft from a memory, the automated state data corresponding to an automated scenario;
receiving automated action data from the memory, the automated action data associated with the automated scenario;
generating an additional set of state-action vectors based on the automated state data and the automated action data;
determining an additional safe reward Q value associated with the additional set of state-action vectors;
determining an additional cost reward Q value associated with the additional set of state-action vectors;
optimizing the training safe reward Q value and the training cost reward Q value by minimizing loss based on $L=E [Q (s_t, a_t)-(r_t+\gamma \max_a' Q(s_t+1, a'))]^2$; and
training the deep Q network based on the additional training data.

17. The method of claim 16, wherein the state data include data matrices associated with the aircraft, the data matrices indicating a heading value, a position value, a system state value, an environmental condition value, a feedback value, a pilot action value, a system availability value, a roll value, a pitch value, a yaw value, a rate of change of roll value, a rate of change of pitch value, a rate of change of yaw value, a longitude value, a latitude value, a rate of change of position value, a rate of change of velocity value, or any combination thereof.

18. The method of claim 15, wherein the action data corresponds to a change in heading, a change in velocity, a change in roll, a change in pitch, a change in yaw, a change in a rate of change of roll, a change in a rate of change of pitch, a change in a rate of change of yaw, change in a rate of change of position, a change in a rate of change of velocity, or any combination thereof.

19. The method of claim 14, further comprising calculating an alternate cost reward Q value using the deep Q network, wherein the alternate cost reward Q value is based on the state-action vectors associated with the aircraft and substantially corresponds to the highest safe reward Q value.

20. The method of claim 19, wherein the highest safe reward Q value is associated with landing the aircraft at a predetermined destination or a calculated emergency destination in response to an emergency.

* * * * *